United States Patent [19]

Bardfeld

[11] 4,280,599

[45] Jul. 28, 1981

[54] BRAKE APPARATUS, ESPECIALLY FOR DOOR CLOSERS

[75] Inventor: Rosalia Bardfeld, Vienna, Austria

[73] Assignee: Anstalt fuer Schliesstechnik, Vaduz, Liechtenstein

[21] Appl. No.: 62,565

[22] Filed: Aug. 1, 1979

[30] Foreign Application Priority Data

Aug. 10, 1978 [CH] Switzerland ........................ 8505/78

[51] Int. Cl.[3] ................................................ F16F 9/14

[52] U.S. Cl. .......................................... 188/310; 16/58

[58] Field of Search ............... 188/290, 299, 306, 310; 16/58

[56] References Cited

U.S. PATENT DOCUMENTS

| | | | |
|---|---|---|---|
| 1,564,227 | 12/1925 | Flentje | 188/310 |
| 2,016,591 | 10/1935 | Chapin | 188/310 |
| 2,286,516 | 6/1942 | Swanson | 188/310 |
| 2,707,796 | 5/1955 | Hawks | 16/58 |

FOREIGN PATENT DOCUMENTS

| | | | |
|---|---|---|---|
| 476403 | 12/1952 | Italy | 188/306 |

*Primary Examiner*—Edward R. Kazenske

*Attorney, Agent, or Firm*—W. G. Fasse; D. F. Gould

[57] ABSTRACT

A brake of this type has a brake shaft and a brake wing secured to the shaft so that the wing is rotatable with the shaft in a brake housing filled with a brake medium. A cam ring located in the brake housing has a control curve or surface which cooperates with a cut-out in the brake wing so that the size of a gap formed between the cam ring surface and the brake wing depends on the angular position of the wing relative to the cam ring whereby the dampening action of the brake medium on the movement of the brake wing varies with said angular position of the brake wing relative to the normally stationary cam ring.

6 Claims, 2 Drawing Figures

BRAKE APPARATUS, ESPECIALLY FOR DOOR CLOSERS

BACKGROUND OF THE INVENTION

Figure 1:
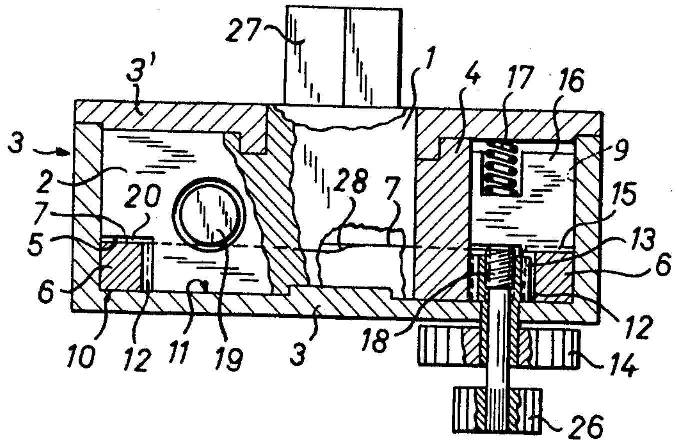

The present invention relates to a brake apparatus, especially for door closers and similar brake or damping devices for controlling, or rather, damping the movement of a movable member. Such devices include a closed housing, the inner space of which is filled with a brake medium. A brake wing rotatable with the brake shaft is movable inside the housing. The inner housing space is divided by a fixed brake wall.

Door closers of various types are known in the art. However, the control of the movable member by the brake or damping device leaves room for improvement.

OBJECTS OF THE INVENTION

In view of the above it is the aim of the invention to achieve the following objects singly or in combination:

to construct a brake or damping device as described above so that it is simple, substantially trouble-free, yet reasonably priced;

to achieve a controlled braking or damping action;

to provide a brake or damper for various movable members which rotate or tilt about a hinging axis through a predetermined angular range;

to construct the brake or damper in such a manner that a predetermined closing function or movement function of the controlled member is assured, whereby such closing or movement function is to be adjustable;

to construct the brake or damper so that the initial movement of the controlled member will be subjected to a relatively small damping action while the damping or braking action is increased toward the end of the intended movement range; and to provide adjustment means for the brake or damper which permit the selection of the point or range where a relatively small damping action changes into a relatively larger damping action.

SUMMARY OF THE INVENTION

According to the invention there is provided a brake or damper in which a brake or damping wing is rotatable in a housing relative to a ring member arranged concentrically relative to the brake or damper shaft. The wing is provided with a cut-out for the passage of a brake medium as the wing rotates relative to the ring which is provided with a control or cam curve along one of its boundary surfaces facing the cut-out in the wing. The shape of said control or cam curve is such that the cross sectional area of the passage for the brake medium between the wing and the ring varies as the ring is titled or rotated along the stationary ring, whereby the brake or damping intensity is varied in accordance with the shape of the control curve.

By the formation of the surface of the ring which functions as a control curve, the brake or damping intensity is achieved as a function of the shape or surface configuration of the damping ring which cooperates with the wing, the movement of which corresponds to the movement of the door or any other movable member so that at any one instance the position of the wing corresponds to the position of the door to be closed or to be opened. Thus, a desired closing or opening function or any other controlled movement sequence is achieved.

In a preferred embodiment the position of the ring and thus the position of the control curve forming one surface of the ring is rotatable concentrically relative to the brake or damper shaft whereby the control function and thus the movement sequence of the controlled member may be varied even after installation of the present apparatus and without exchanging one ring against another ring having a different control curve or cam surface.

BRIEF FIGURE DESCRIPTION

Figure 2:
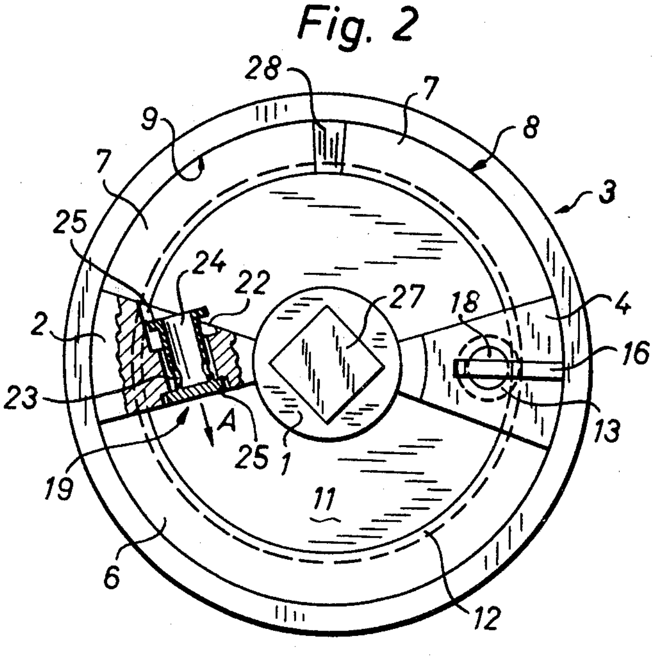

In order that the invention may be clearly understood, it will now be described, by way of example, with reference to the accompanying drawings, wherein:

FIG. 1 is a sectional view substantially centrally through the present brake or damping device along the rotational axis of the brake shaft; and FIG. 2 is a top plan view of the brake or damping apparatus according to the invention with its cover removed.

DETAILED DESCRIPTION OF PREFERRED EXAMPLE EMBODIMENTS AND OF THE BEST MODE OF THE INVENTION

The brake or damping apparatus comprises a brake shaft 1. A brake wing 2 is rigidly secured to the shaft 1. If desired, the shaft 1 and the wing 2 may form an integral component. A housing 3 is preferably cylindrical and closed by a cover 3'. The brake shaft 1 has a square bar free end 27 extending out of the housing 3 for connection to a movable member, the movement of which is to be controlled.

The brake wing 2 is movable in the closed housing 3 which is filled with a brake medium such as a high viscosity material which may even have a paste type consistency, for example, a mixture of lubricating type greases and solid components such as fine sawdust or the like.

A brake wall 4 is arranged inside the housing 1 to extend radially substantially from the inner surface of the housing wall 9 to the brake shaft 1. The wall 4 divides the inner space of the housing in cooperation with the brake wing 2 which is tiltable in unison with the brake shaft 1. Thus, two chambers are formed inside the housing 3 whereby one chamber is increased in its volume when the wing 2 rotates while the other chamber is decreased in its volume simultaneously and vice versa. The volume increase and decrease are respectively commensurate.

According to the invention the brake wing 2 is provided with a cut-out 5. A ring 6 arranged concentrically relative to the brake shaft 1 reaches into the cut-out 5. The upwardly facing surface of the ring 6 is constructed as a cam or control curve 7. Stated differently, the cross sectional size of the ring 6 varies along the ring, whereby also the cross sectional size of the gap 20 between the ring surface 7 and the cut-out 5 of the wing 2 varies as the wing rotates relative to the stationary ring 6. This gap 20 formed between the control curve 7 and the edge of the cut-out 5 of the brake wing 2 extending in parallel to the control curve 7, provides a passage for the brake medium during the tilting of the brake wing 2. The ring 6 rests against the cylindrical inner wall 9 and against the bottom 11 of the housing 3. The inwardly facing ring surface of the ring 6 is provided with gear teeth 12 which mesh with a pinion 13 secured to the upper end of a shaft which extends through the bottom of the housing 3. The outer end of the shaft is provided with a hand wheel 14 whereby the pinion 13 may be rotated and thus the position of the ring 6 may be adjusted coaxially relative to the inner housing wall 9.

Accordingly, the control or curve cam surface 7 of the ring 6 is also adjusted in its position inside the housing 3 whereby the cross sectional area of the passage for the brake medium as described above may also be varied. Thus, the closing movement of a door may be controlled as desired by a braking or damping intensity which differs during the closing or opening operation.

The control curve 7 is provided with a step 28 whereby the throughflow cross sectional area of the gap 20 is made narrower above the control curve 7. Thus, the rotational movements of the brake wing 2 is slowed down. Instead of a step 28 it would be possible to provide the control or cam curve 7 with a steady rise or slope similar to one turn or the portion of one turn of a threading, whereby the rise or the pitch of such threading would extend preferably only over a portion of the circumference of the ring.

In order to rotate the ring 6 for adjustment without any hindrance, the brake wall 4 is also provided with a recess 15 extending over the ring 6. The portion of the recess 15 facing the cam or control curve surface 7 has such a spacing from the latter that even when the highest portion of the curve 7 passes through the recess 15, such passing may take place freely. Therefore, at least when the highest portion of the surface 7 is not within the recess 15 of the brake wall 4, there is an additional passage possibility provided for the brake medium. In order to prevent such additional passage possibility for the brake medium a slide member 16 is arranged inside the brake wall 4 in such a manner that the elevational position of the slide member 16 is variable. For this purpose a spring 17 presses the slide 16 against the surface of the control or cam curve 7 whereby the brake wall 4 is sealed relative to the ring 6.

It may be desirable to provide for a fine adjustment of the brake or damping intensity by a limited passage possibility for the brake medium between the slide 16 and the surface of the control curve 7. For this purpose the slide 16 may be raised against the force of the spring 17 by means of a threaded spindle 18 cooperating with an inner threading in the hollow shaft of the pinion 13. The outer end of the threaded spindle 18 is provided with a knob 26 for the adjustment of the slide 16 substantially independently of the movement of the pinion 13.

A check valve 19 is operatively inserted in the brake wing 2. The check valve 19 comprises a movable, cylindrical valve member 22 inserted in the wing 2. Radial bores 23 open into the central hollow space 24 of the valve member 22. The valve member 22 is provided at both of its ends with ring shaped stop members 25. In the position shown in FIG. 2 the check valve 19 is closed. When the valve member 22 is moved in the direction of the arrow A relative to the brake wing 2, it is possible for brake medium to flow through the hollow space 24 and through the bores 23.

As mentioned, the brake medium is preferably a high viscosity or paste type material comprising, if necessary, mixtures of greases and solid materials, whereby the selection of the proper brake medium and its viscosity will depend on the prevailing temperatures and other climatic conditions of the region in which the brake or damper will be used. Due to the fact that such brake media are practically incompressible, each change in the passage cross sectional area immediately has its effect in a respective change of the brake intensity. Incidentally, by using a high viscosity brake medium it is not necessary to provide sealing means between the inner housing wall and the brake wing 2.

The operation of the apparatus according to the invention will now be described with reference to the opening or closing of a door. When a door is being opened, the brake wing 2 as best seen in FIG. 2, is connected by lever means not shown so that the hinging movement of the door hinge axis is transmitted to the square bar end 27 of the present apparatus. The door opening thus tilts or rotates the wing 2 in the clockwise direction. Simultaneously, a door closure spring, not shown, is cocked. The check valve 19 in the brake wing 2 is opened during this rotating, door opening movement in that the check valve 19 moves relative to the brake wing 2 in the direction of the arrow A shown in FIG. 2. Thus, an additional passage is provided for the brake medium resulting in an easy opening of the door. At the beginning of the closing movement of the door which is to be dampened, that is when the brake wing 2 moves in the counter clock-wise direction, the check valve 19 closes automatically due to the counter pressure of the brake medium. Thus, during the closing movement of the door the brake medium can pass only through the passage opening or gap 20 between the edge of the brake wing 2 and the control curve surface 7 of the ring 6. During the closing movement of the door caused by a closing spring, not shown, the brake wing 2 moves in the counter-clockwise direction as shown in FIG. 2, whereby the cross sectional passage area of the gap 20 diminishes in accordance with the shape of the control surface 7. Thus, the brake intensity is increased in such a manner that the closing movement takes place very slowly toward the end of the closing operation whereby the door is closed substantially without any audible noise.

By rotating the ring 6 with the aid of the hand wheel 14 secured to the hollow shaft of the pinion 13 outside the housing 3, it is possible to adjust the damping action for the closing movement as desired. This is possible, because by rotating the ring 6 the passage opening 20 for the brake medium may be enlarged or made smaller which results in a smaller or higher brake intensity.

A fine adjustment of the brake intensity may be accomplished additionally in that a substantially constant brake medium passage is provided in the opening or recess 15 of the brake wall 4 which opening may be adjusted by a larger or smaller lifting of the slide 16 away from the control surface 7 by means of the threaded spindle 18. This may be accomplished by the above mentioned hand wheel 26 providing for a very precise control or adjustment depending on the pitch of the threaded end of the spindle 18.

According to a modification, the gear teeth 12 may extend only along a portion of the inner circumference of the ring 6 whereby the remaining portion of the inner surface may be constructed as a control curve. Thus, such control or cam surface will extend at right angles to the embodiment shown in FIG. 1.

Although the invention has been described with reference to specific example embodiments, it will be appreciated, that it is intended to cover all modifications and equivalents within the scope of the appended claims.

What is claimed is:

1. A brake apparatus, comprising substantially closed housing means, shaft means rotatable in said housing means, a brake medium in said housing means, brake wing means including a cut-out portion, said brake wing means being operatively secured to said shaft means for rotation with said shaft means in said housing means, fixed wall means dividing a space inside said housing means, brake action control ring means including cam surface means operatively located in said housing means for cooperation with said cut-out portion of said brake wing means whereby a gap is formed between the brake wing means and said cam surface means of said control ring means, said gap having a cross-sectional area which varies in its size depending on the position of said brake wing means relative to said cam surface means of said control ring means, thereby controlling the passage of said brake medium through said gap, said control ring means being arranged concentrically relative to said shaft means, and means operatively connected to said control ring means for turning said control ring means in said housing means comprising gear means as part of said control ring means, gear pinion means arranged for meshing cooperation with said gear means, and drive means operatively connected to said gear pinion means, said drive means extending through said housing means, whereby said control ring means are adjustable from outside said housing means.

2. The apparatus of claim 1, wherein said housing means has a cylindrical inner surface and a bottom surface, said control ring means resting adjustably against said cylindrical inner housing surface and against said bottom surface.

3. The apparatus of claim 1, wherein said brake medium has a pasty consistency and is a mixture of greases and solid material.

4. The apparatus of claim 1, further comprising slide means operatively arranged for movement relative to said fixed wall means in parallel to said shaft means, and spring means arranged for biasing said slide means against said control ring means whereby the latter is sealed relative to said fixed wall means, and adjustment means operatively connected to said slide means for spacing said slide means away from said control ring means against the force of said spring means, said adjustment means extending through said housing means, whereby said adjustment means are operable from the outside of said housing means.

5. The apparatus of claim 4, wherein said adjustment means comprise a threaded spindle.

6. The apparatus of claim 1, further comprising check valve means operatively installed in said wing means.

* * * * *